(12) United States Patent
Takashima et al.

(10) Patent No.: US 6,729,154 B2
(45) Date of Patent: May 4, 2004

(54) AIR CONDITIONER

(75) Inventors: Shinsei Takashima, Kawasaki (JP);
Masamitsu Usui, Kawasaki (JP);
Hideyuki Umenaka, Kawasaki (JP);
Yoji Maki, Kawasaki (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 10/464,758

(22) Filed: Jun. 19, 2003

(65) Prior Publication Data

US 2004/0000160 A1 Jan. 1, 2004

(30) Foreign Application Priority Data

Jun. 27, 2002 (JP) ........................... 2002-187708

(51) Int. Cl.⁷ ..................... F25D 17/04; F25D 23/12; B01D 39/00; B01D 41/00; B01D 59/00
(52) U.S. Cl. .................. 62/317; 62/262; 55/282; 55/282.2; 55/284; 55/295; 55/296; 55/423; 55/428; 55/428.1; 55/429
(58) Field of Search ............. 62/317, 262; 55/282–296, 55/423–429

(56) References Cited

U.S. PATENT DOCUMENTS

| | | | | | |
|---|---|---|---|---|---|
| 4,157,251 A | * | 6/1979 | Colomer | ...................... | 96/229 |
| 5,600,963 A | * | 2/1997 | Koo et al. | ..................... | 62/262 |
| 5,626,517 A | * | 5/1997 | Kil | .............................. | 454/315 |
| 5,980,598 A | * | 11/1999 | Horvat | ......................... | 55/294 |
| 6,066,041 A | * | 5/2000 | Hernandez et al. | .......... | 454/201 |
| 6,129,781 A | * | 10/2000 | Okamoto et al. | ............... | 96/25 |
| 6,199,397 B1 | * | 3/2001 | Khelifa et al. | ................. | 62/317 |
| 6,248,145 B1 | * | 6/2001 | Radke | .......................... | 55/295 |
| 6,338,382 B1 | * | 1/2002 | Takahashi et al. | ............. | 165/96 |

* cited by examiner

*Primary Examiner*—William C. Doerrler
*Assistant Examiner*—Filip Zec
(74) *Attorney, Agent, or Firm*—Kanesaka & Takeuchi

(57) ABSTRACT

An air conditioner having a dust removing device which enables dust having stuck to its filters to be automatically removed without fail and prevents the removed dust from sticking again to the filters is to be provided. It is equipped with a sliding device 6 (motor 6) for sliding in a prescribed direction filters 5 arranged between an air intake port 121 and a heat exchanger 3, and with cleaners 7 to remove dust having stuck to the filters 5, automatically cleans the filters 5 and prevents the removed dust from being brought out of the cleaners 7.

11 Claims, 11 Drawing Sheets

AIR CONDITIONER

TECHNICAL FIELD

The present invention relates to an air conditioner having a cleaning function to automatically cleaning smeared filters, and more particularly to an air conditioner permitting removal of dust sticking to filters without fail and easy collection of the removed dust.

BACKGROUND ART

The interior unit of a currently available air conditioner has dust arresting filters to prevent dust from entering through the air intake port. Usually, these filters are detachable, and the user would take them off from time to time, clean them and return to the interior unit.

Since an air conditioner is usually installed in a high position in a room, it is extremely difficult for an aged person or a woman to take off and return the filters. This leads to a problem that the user is apt to neglect cleaning of the filters at an adequate frequency.

If dust is allowed to remain accumulating on filters, not only will the air flow rate drop to reduce the efficiency of heat exchange, but also the dust will gather mold, which would generate a foul smell or house dust, to which many persons are allergic.

As a proposed solution to this problem, the Japanese Patent Application Publication No. 2001-99479 discloses roll-shaped circulating filters and a dust removing device arranged on the path of circulation so that the latter can remove dust having stuck to the former. This, however, involves the following problems.

First, according to this example of the prior art, the filters cannot be removed, and therefore they cannot be washed or otherwise cleaned completely. Even if the filters are detachable, they may be hurt when they are reinstalled.

Second, since the top face of the dust removing device is open all the time, when the dust collector box becomes filled with dust, the dust in the box may be scraped out when the filters are rolled up.

Above all in the ceiling-wall type interior unit of the air conditioner, which has become available recently, intended for installation at the corner between a wall and the ceiling, dust will more easily accumulate on filters because the air intake port is open towards the ceiling, and accordingly the filters should be cleaned more frequently.

SUMMARY OF THE INVENTION

An object of the present invention, therefore, is to provide an air conditioner having a cleaning function to permit removal of dust sticking to filters without fail and easy collection of the removed dust.

In order to achieve the object stated above, an air conditioner, according to the invention, whose cabinet having an air intake port and an air outlet port accommodates a heat exchanger and an air blower and in which a dust filter or filters are arranged in position between the air intake port and the heat exchanger, is provided within the cabinet with sliding means for reciprocating the filters and cleaners, arranged to come in contact with the filters along the shifting paths of the filters.

This arrangement of the cleaners to have the filters intervening between them enables not only both faces of the filters to be cleaned without fail but also to securely store and collect the removed dust.

While the filter sliding means may reciprocate the filters within the cabinet, it is more preferable to reciprocate the filters into and out of the cabinet. As this arrangement enables the filters to be discharged outside, the exposed filters can be taken out and wiped.

To facilitate collection of the dust that has been arrested, it is preferable for the cleaners to be detachably provided in the cabinet.

In a preferred mode for carrying out the invention, the cleaners have a bottom cover having a first brush or brushes for cleaning one side each of the filters and a top cover openably fitted to the bottom cover and having a second brush or brushes for cleaning the other side each of the filters.

This enables the dust having accumulated inside to be easily collected by opening and closing the cleaners, and both faces of the filters to be cleaned by passing them between opposing brushes.

In a more specific configuration, it is preferable for at least one of the brushes to have an upright brush, which comes into contact with the filters at a right angle, and an inclined brush, which comes into contact with the filters obliquely at a prescribed angle. This arrangement serves to further enhance the effect of scraping the dust as the bristles of the inclined brush to be inserted along the meshes of the filters.

It is preferable for inlet slits to be provided to let the filters into the cleaners between the two ends each of the bottom cover and the top cover, and for the inlet slits to have openings on the shifting paths of the filters.

It is further preferable for at least one of the inlet slits to have a shutter to open the inlet slits when the filters are shifting in the forward direction, press the inlet slits in the closing direction when the filters are shifting in the backward direction, and thereby to prevent the dust having accumulated in the cleaners from being discharged out of the cleaners.

This arrangement prevents without fail the dust once scraped off the filters from being brought out of the cleaners again.

In a more specific mode of implementation, the shutter has a pair of shafts arranged in parallel to each other, a pair of scrapers opening and closing round the shafts in directions moving away and towards each other, and opening/closing levers fitted to the shafts to open or close the scrapers via prescribed scraper opening/closing means.

To provide against rare cases of dust sticking again to the filters, it is preferable for each opposing face of the scrapers to have a wiper which, when the scrapers are closed, come into contact with the filters to wipe off the dust stuck to the filters.

Rails along which the opening/closing levers shift and guiders, formed at both ends of the rails, for guiding the opening/closing levers towards either opening rails or closing rails of the rails are provided at parallel edges of the filters along the sliding direction, and this arrangement makes possible synchronous operation of the sliding of the filters and the scrapers.

It is preferable for each of the filters to have a mesh section in a grid form and a frame surrounding the mesh, both being molded integrally, and the height of meshes parallel to the sliding direction (warps) to be set higher than the height of meshes orthogonally crossing the sliding direction (wefts). This arrangement makes it easier for the brush bristles to enter into the meshes and to scrape dust because the meshes manifest themselves in a parallel stripe form in the filter surfaces along the sliding direction.

BRIEF DESCRIPTION OF DRAWINGS

FIG. 5A shows a partial sectional view for describing the method by which a bottom cover and a top cover are snapped on;

DETAILED DESCRIPTION

Figure 1:
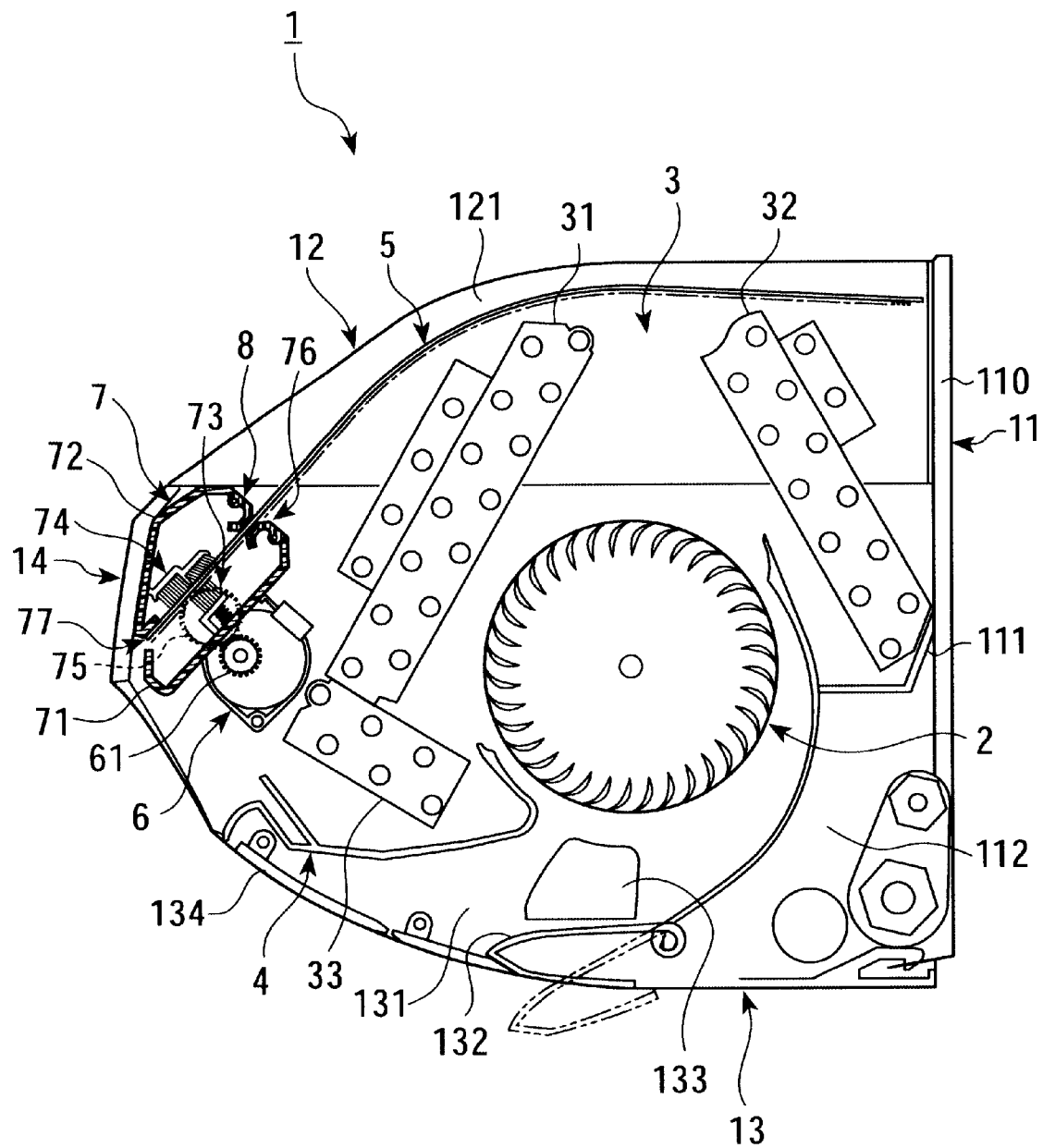
FIG. 1 shows a section of essential parts of an air conditioner, which is a preferred embodiment of the present invention.

Next, a preferred embodiment of the present invention will be described with reference to the accompanying drawings. FIG. 1 shows a section of the interior unit of an air conditioner, which is the preferred embodiment of the invention.

The cabinet 1 of this air conditioner has a base 11 installed on a wall surface via metal fittings (not shown), a top panel 12 and a front panel 13, all built of synthetic resin. The cabinet 1 houses a cross flow fan 2 as the air blower, a heat exchanger 3 and a drain pan 4 among other items.

The base 11 has a back plate 110 and a pair of side plates, arranged right and left and formed to protrude forwards from the two sides of the back plate 110, the heat exchanger 3 being fitted between those side plates.

In this embodiment, the heat exchanger 3 includes three heat exchanging units 31 through 33 combined in a substantial Λ (lambda), and is arranged to cover the cross flow fan 2 from above.

In the base 11 is formed a drain pan portion 111 to receive dew drops generated by the rear side heat exchanging unit 32, and in the lower part of the back face is formed an accommodating groove 112 to accommodate various lines of piping and electric wires.

Towards the upper end of the base 11 is fitted the top panel 12. The top panel 12 is fixed to the base 11 via engaging pawls (not shown) protrusively provided at the rear end of the top panel 12, whose front edges extends in an arch shape to the tip of the front panel 13 so as to cover the heat exchanger 3.

An air intake port 121 is provided over the whole area of the top panel 12. Though not shown, the air intake port 121 has a grill molded in a grid form. The grid part may be detachable, and its shape can be chosen as desired.

Towards the lower end of the base 11 is fitted the front panel 13. The front panel 13 includes a pair of side plates, arranged right and left and formed to cover the two side plates of the base 11, and its rear end is detachably fixed to the base 11 via engaging pawls (not shown) while the front part is formed to have a section of a ship bottom shape curving upwards from the base 11.

At the center of the front panel 13 is provided an air outlet port 131 from which air from the cross flow fan 2 is blown out. The air outlet port 131 has a diffuser 132 for controlling the flow rate of the blown air, horizontal wind vanes 133 and vertical wind vanes 134 for regulating the air blowing direction.

In this embodiment of the invention, a plurality of horizontal wind vanes 133 are arranged in a row above the diffuser 132 along the lengthwise direction of the cabinet 1 (in the vertical direction of the paper surface of FIG. 1). The two vertical wind vanes 134 are provided along the surface of the front panel 13 so as to block the air outlet port 131.

On the front face of the front panel 13 is integrally provided a hinged panel 14, which is opened and closed when filters 5 are to be drawn out of the interior unit. The hinged panel 14 is pivoted on its upper end. When the filters 5 are moved outwards, the other end of the hinged panel 14 is raised by the filters 5 to enable the filters 5 to be drawn out of the interior unit (see FIG. 11).

This hinged panel 14 is also used as approaching means when cleaners 7 are to be detached from the cabinet 1.

Between the air intake port 121 of the top panel 12 and the heat exchanger 3 are provided the filters 5 for removing dust from the air flowing towards the heat exchanger 3, and the side plates of the base 11 have a sliding device 6 (a motor 6) for sliding the filters 5 in a prescribed direction and the cleaners 7 for removing dust having stuck to the filters 5.

Figure 7A:
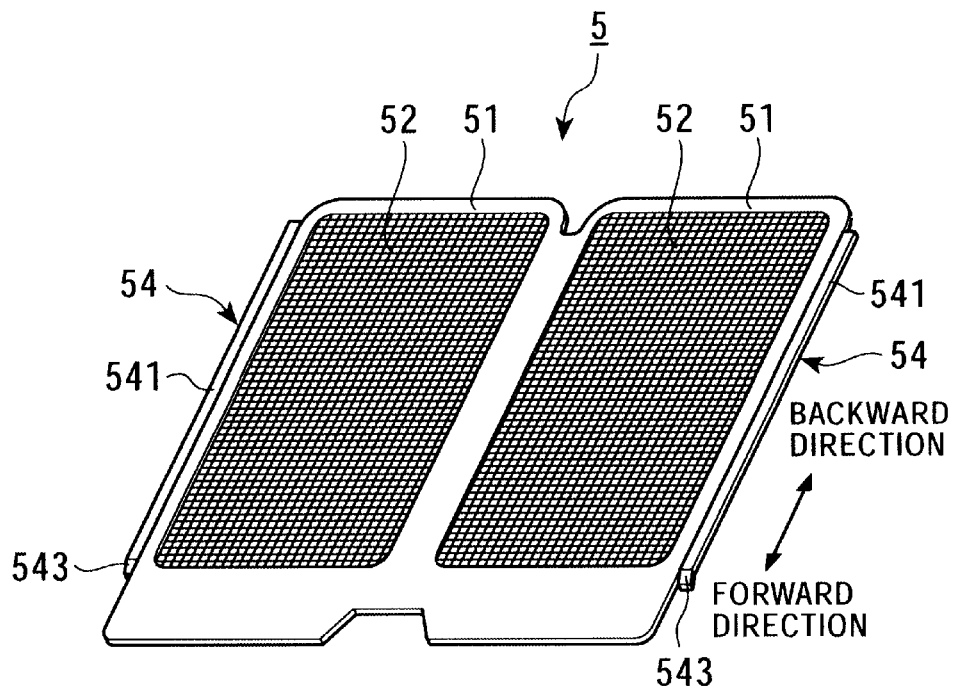
FIG. 7A shows a perspective view of a filter as seen from the front side.
Figure 7B:
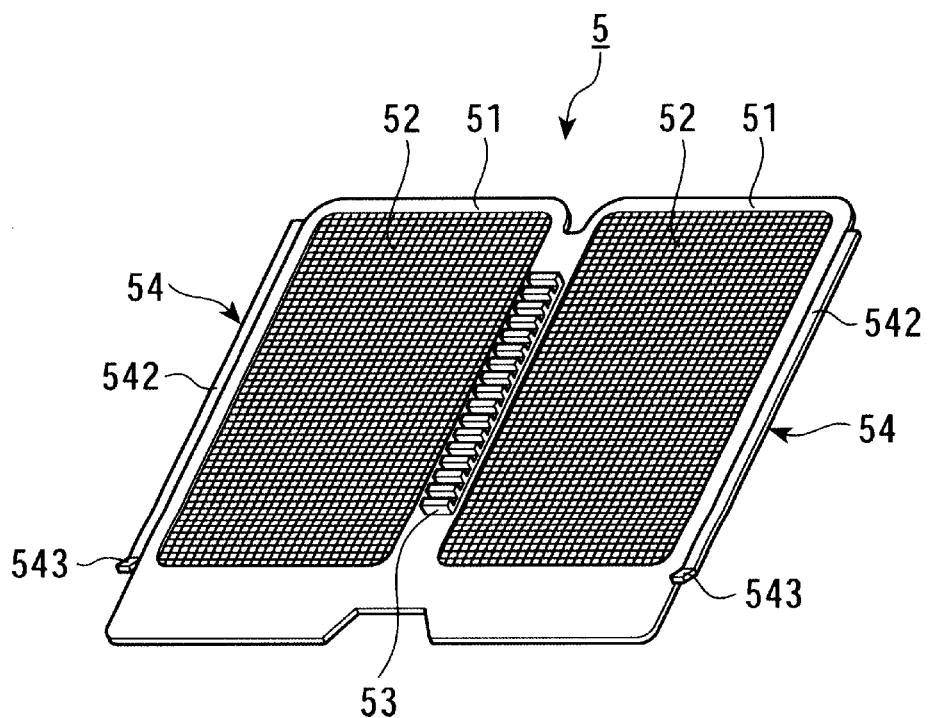
FIG. 7B shows a perspective view of the filter as seen from the rear side.

FIG. 7A and FIG. 7B show perspective views of the filters as seen from the from and the back, respectively. Each of the filters 5 has a frame 51 having a prescribed width and two filter sections 52 surrounded by the frame 51 and having regular meshes. The frame 51 and the filter sections 52 constitute an integrally molded synthetic resin unit.

In this embodiment two filters 5 are provided per cabinet 1, and the filters 5 are actually arranged side by side along the lengthwise direction of the cabinet 1 (the vertical direction of the paper surface of FIG. 1). Since the configurations of the two filters 5 are the same, only one of them will be described, and the description of the other will be dispensed with.

Although each filter 5 is partitioned into the two filter sections 52 by part of the frame 51, it may as well be partitioned into four sections or consist of only one filter section 52.

The filters 5 consist of a base resin, such as propylene, but it is more preferable to add an antistatic agent, such as an electroconductive resin, because the filters 5 are apt to be electrified by friction with nylon brushes 73 and 74 and it is necessary to prevent dust from being attracted by the electrified filters. Besides that, an anti-mold agent and/or an antibacterial agent may be further added.

On the back side of each of the filters 5 is provided a rack 53 along the sliding direction in parallel, and on both side ends of the frame 51 in the sliding direction are arranged rails 54 and 54.

The rack 53 consists of a train of rack teeth formed at a prescribed pitch, and engages with the rotary gear 75 of a bottom cover 71. Although the rack 53 is formed at the center of each filter 5 in this embodiment, its position is not particularly limited to this, but may be altered as appropriate.

The rails 54 and 54 consist of two rail strips integrally protruding from the two side edges of the frame 51 in the sliding direction, and at one end (the front end in the outgoing direction in this embodiment) is provided a guider 543 for guiding opening/closing levers 83a and 83b of the cleaners 7 to be described afterwards to either an opening rail 541 or a closing rails 542.

In this embodiment of the invention, each of the guiders 543 is a piece formed by obliquely cutting and raising one end of the rail strip, and such cut-raised pieces are in contact with the opening/closing levers 83a and 83b.

The filters 5 are slidably supported by two guide rails (not shown) provided on the side walls of the top panel 12, and the front end of each is inserted into the cleaner 7.

Figure 8:
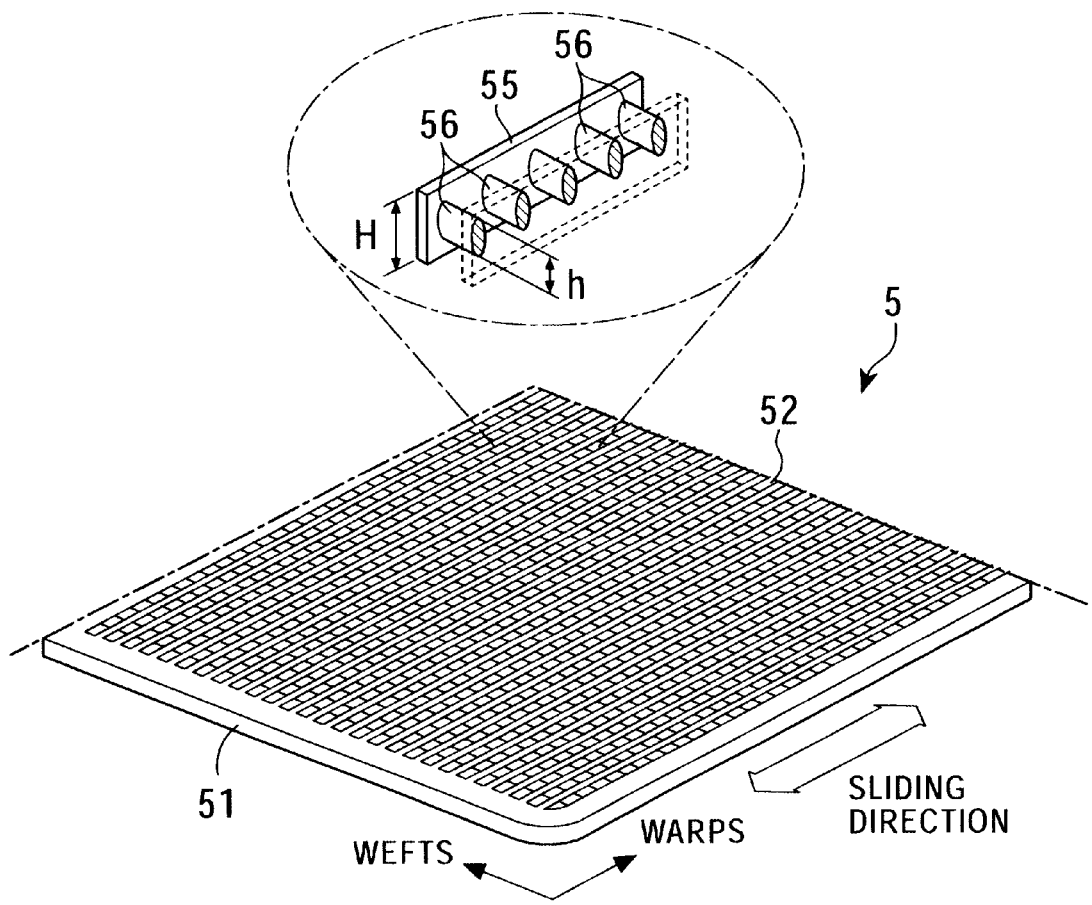
FIG. 8 shows a partially enlarged view of the filter.

FIG. 8 shows a partially enlarged view of one of the filters 5. According to the invention, in the filters 5, the height H of meshes parallel to the sliding direction (warps 55) is set to be higher than the height h of meshes orthogonally crossing the sliding direction (wefts 56).

This arrangement results in a large number of parallel filter grooves in the faces of the filters 5 along the sliding direction, which, when the filters 5 are slid, make it easier for the brushes 73 and 74 installed in the cleaners 7, to be described afterwards, to enter into the meshes and thereby to remove without fail the dust stuck therein.

Next will be described the motor 6 and the cleaners 7 with reference to the enlarged view of FIG. 2. The motor 6 is fixed to a flank of the base 11 via a fitting portion 62, and its output shaft is fitted with an output gear 61 which is to engage with the rotary gear 75 provided on the bottom cover 71 of the cleaners 7 to be described afterwards.

This motor 6, driven by control/drive means (not shown), is driven under remote control or timer control, for instance. There is no limitation as to its specific driving method or rotational sequence.

Figure 3:
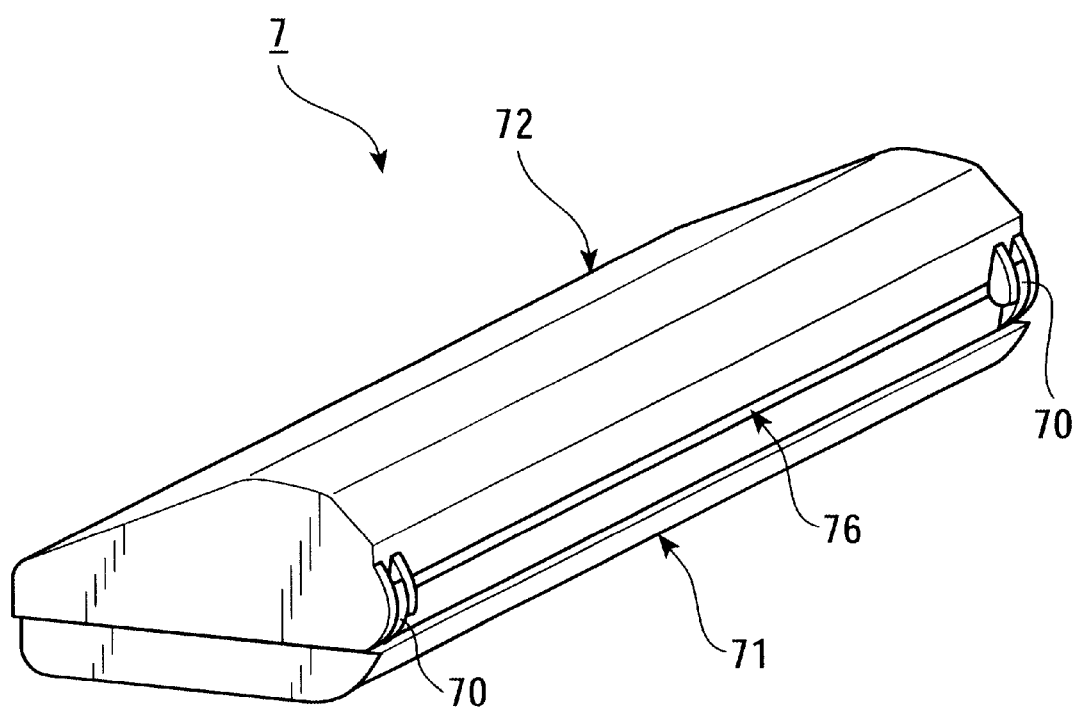
FIG. 3 shows a perspective view of the cleaner.
Figure 4:
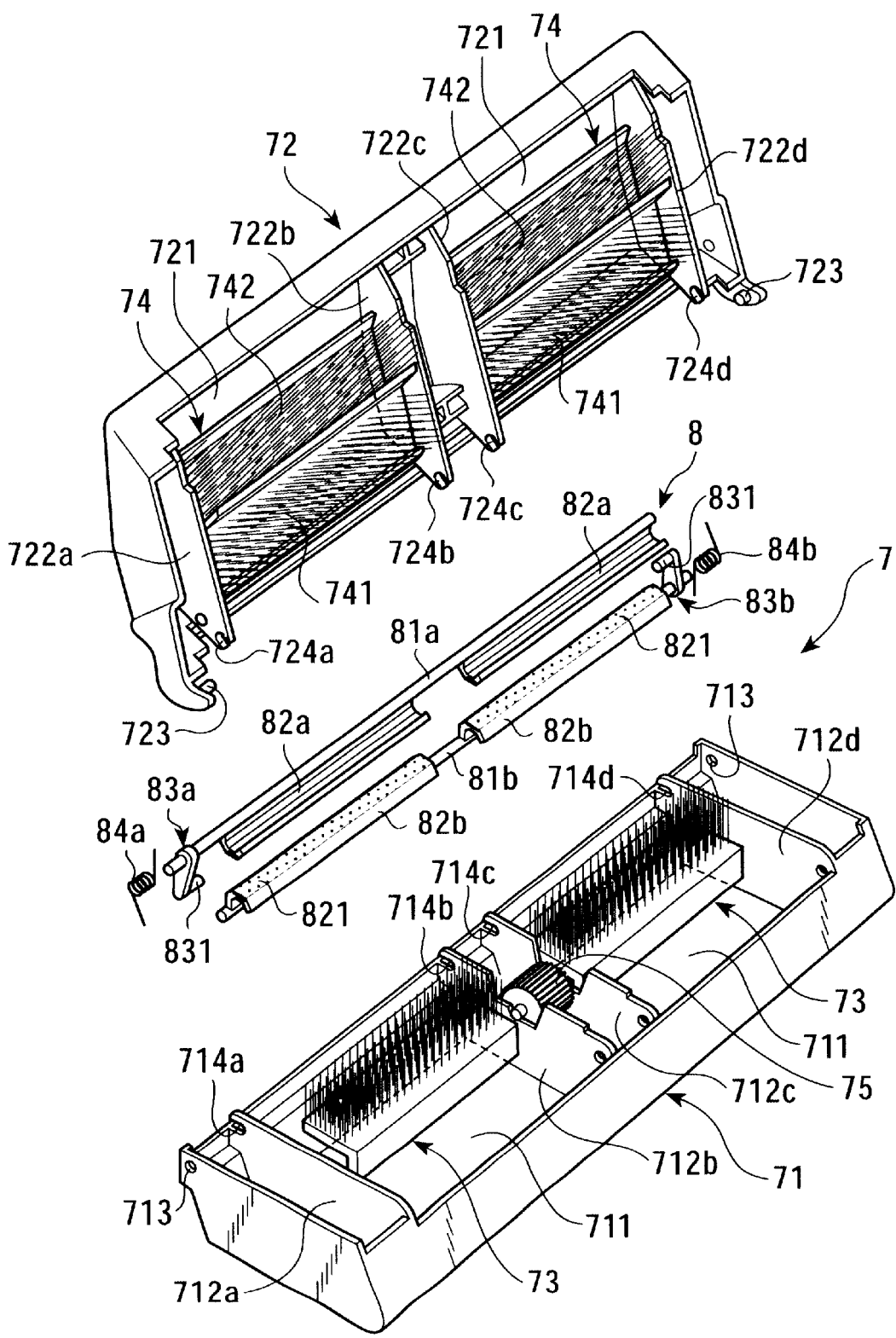
FIG. 4 shows an exploded perspective view of the cleaner to be fitted to the air conditioner.

Each of the cleaners 7, as shown in FIG. 3 and FIG. 4, comprises the bottom cover 71 and a top cover 72 placed over the bottom cover 71. One of its ends is fixed via a hinge 70, and the other is openable.

One cleaner 7 is provided for each of the filters 5 described above. In this embodiment, one for each of the two filters 5, namely a total of two cleaners 7 are arranged within the cabinet 1. As the configurations of the two cleaners 7 are the same, only one of them will be described, and the description of the other will be dispensed with.

The bottom cover 71 is an integrally molded synthetic resin item, shaped as a box whose width is at least greater than the combined width of the filters 5 and inside which are provided storages 711 for accommodating dust. Within the bottom cover 71, there are provided reinforcing ribs 712a through 712d (four of them in this embodiment) at prescribed intervals, and the ribs 712a through 712d form two storages 711 and 711.

Out of the ribs 712a through 712d, the ribs 712b and 712c are provided in parallel in the middle of the bottom cover 71, and the rotary gear 75 to engage with the motor 6 is rotatably pivoted between the ribs 712b and 712c.

Figure 2:
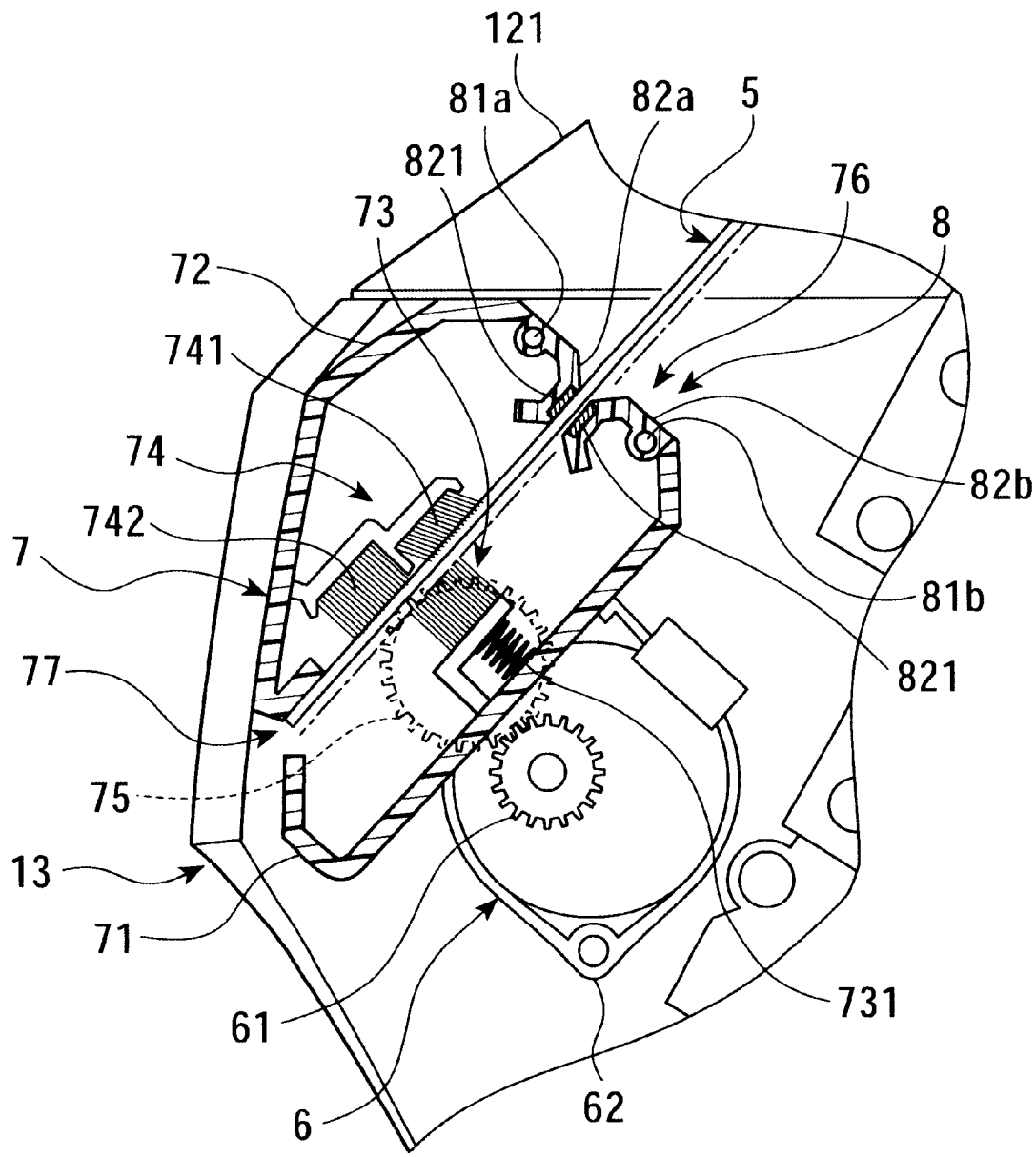
FIG. 2 shows an enlarged section of the vicinities of the cleaner of the air conditioner.

The rotary gear 75, as shown in FIG. 2, is partly exposed out of the bottom face of the bottom cover 71, and is engaged with the output shaft 61 of the motor 6.

Within each of the storages 711, there is provided a first brush 73 for cleaning one face of the matching filter 5. In this embodiment, the first brush 73 consists of a straight brush having many bristles planted at prescribed intervals and arranged to be in contact with the filter 5 at a right angle.

While the first brushes 73 are supported by L-shaped supporting ribs in this embodiment, it is more preferable to provide pressing means 731, such as a compression spring, between the supporting ribs and the bottom cover 71 as shown in FIG. 2, so that the first brushes 73 can be kept in contact with the filters 5 all the time.

The top cover 72 is a long box-shaped synthetic resin item that can be snapped onto the bottom cover 71 along the edges of its opening and is at least greater than the combined width of the filters 5, and partitioning ribs 722a through 722d are provided within the storages 711 in four positions respectively opposite the ribs 712a through 712d mentioned above. Within the top cover 72, too, two storages 721 and 721 are arranged with the ribs 722a through 722d provided between them.

The top cover 72 has shafts 723 and 723 at their connected ends, and is openably supported as these shafts 723 and 723 are pivoted on bearing holes 713 and 713 in the bottom cover 71.

Within each storage 721 of top cover 72 is arranged a second brush 74 for cleaning the other face of the matching filter 5. In this embodiment, the second brush 74 has an upright brush 741, which comes into contact with the filter 5 at a right angle, and an inclined brush 742, which comes into contact with the filter 5 obliquely at a prescribed angle.

Although dust scraped of the filter face towards the top cover 72 is apt to stick again to the filters 5 and carried out of the cleaners 7, insertion of the inclined brushes 742 with oblique bristles into the meshes of the filters enables the dust stuck to the filters 5 to be scraped off without fail. The aforementioned pressing means 731 may as well be provided on the second brushes 74 side.

Figure 5A:
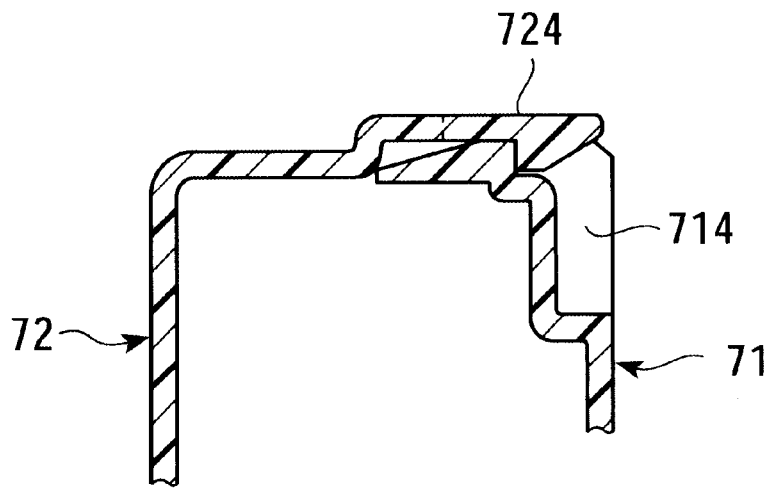
Figure 5B:
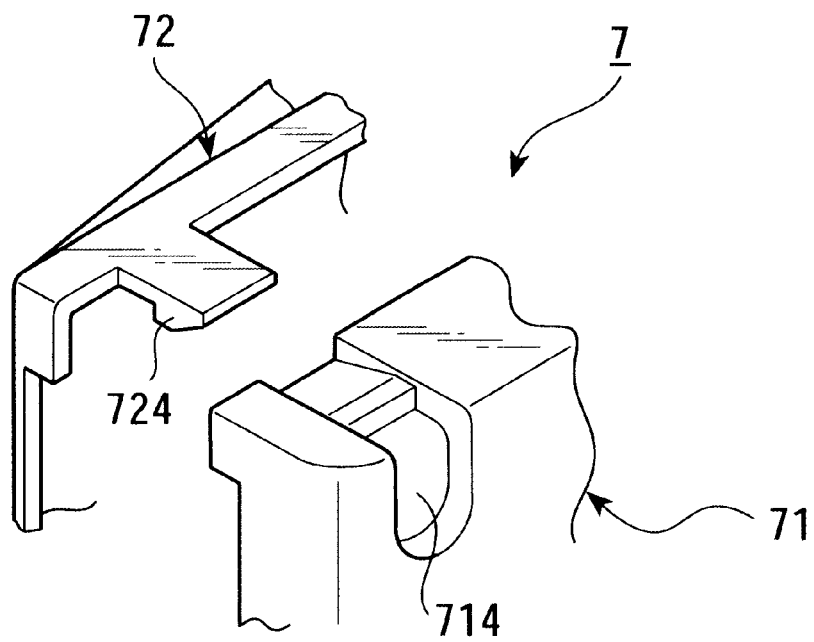
FIG. 5B shows a perspective view of a state in which the bottom cover and the top cover are snapped off.

As shown in FIG. 5A and FIG. 5B, the snap-in grooves 714 for integrally snapping in the top cover 72 are cut in the bottom cover 71, and they are matched by snap-in pawls 724 protruding from the top cover 72 to be snapped into the snap-in grooves 714. Their engagement keeps the bottom cover 71 and the top cover 72 in a closed state.

Although the bottom cover 71 and the top cover 72 are locked with each other by snapping the snap-in pawls 724 into the snap-in grooves 714 in this embodiment, some other appropriate snap-in means may be used as well.

Between the two ends each of the bottom cover 71 and the top cover 72 are provided inlet slits 76 and 77 to let the filters 5 into the cleaners 7. One of them, the inlet slit 76 has a shutter 8 for opening the inlet slit 76 when the filters 5 are to be shifted forward and pressing the inlet slit 76 in the closing direction when the filters 5 are to be shifted backward thereby to prevent the dust having accumulated within the cleaners 7 from being discharged outside the cleaners.

As shown in FIG. 4, the shutter 8 has a pair of shafts 81a and 81b arranged in parallel to each other, a pair of scrapers 82a and 82b which open and close round the shafts 81a and 81b respectively in directions moving away and towards each other, and the opening/closing levers 83a and 83b which are fitted to the shafts 81a and 81b and open or close the scrapers 82a and 82b via prescribed scraper opening/closing means.

One shaft 81a is rotatably pivoted on bearings 714a to 714d provided on the ribs 712a to 712d, respectively, of the bottom cover 71, and the other shaft 81b is rotatably pivoted on bearings 724a to 724d provided on the ribs 722a to 722d, respectively, of the top cover 72. The two shafts rotate in mutually reverse directions.

In this embodiment, coil springs 84a and 84b are provided at one end each of the shafts 81a and 81b, respectively, and the scrapers 82a and 82b are pressed by the spring forces in the closing direction all the time via these coil springs 84a and 84b.

The scrapers 82a and 82b are arranged upright in an L shape integrally along the shafts 81a and 81b, respectively, and placed in mutually symmetric positions. In this embodiment, a total of four scrapers 82a and 82b are provided, consisting of two pairs each of upper and lower ones.

On the opposite faces of the scrapers 82a and 82b are arranged wipers 821 which, when the scrapers are closed, come into contact with the filters to wipe off the dust stuck to the filters. In this embodiments, raised fabric sheets having many fine brush-like hairs are adhered to the wipers 821, but felt or unwoven cloth sheets may as well be used in place of the raised fabric sheets.

The opening/closing levers 83a and 83b are integrally fixed at one end each around the shafts 81a and 81b, and protrude at the other end in an L shape in the direction away from the shafts 81a and 81b. At the tip of each lever is provided a lever arm 831 shiftable along the rails 54 of the filters 5.

As shown in FIG. 4, one opening/closing lever 83a is provided at the left end of the shaft 81a, while the other opening/closing lever 83b is provided at the right end of the shaft 81b. The lever arm 831 of the opening/closing lever 83a is driven by one of the rails 54 (that on the right side in FIG. 7A), while the lever arm 831 of the other opening/closing lever 83b is driven by the other of the rails 54 (that on the left side in FIG. 7A).

While the cleaners 7 are molded synthetic resin items in this embodiment, it is more preferable for an anti-mold agent and/or an antibacterial agent to be further added. They would prevent the dust having accumulated in the cleaners 7 from gathering mold and accordingly from generating a foul smell or the like.

Figure 6A:
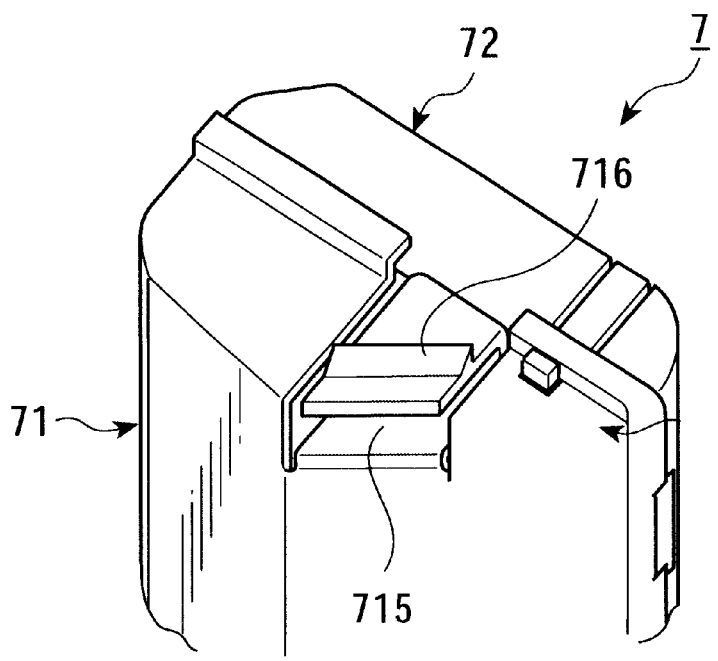
FIG. 6A shows a perspective view for describing fitting means on a flank of the cleaner.

Next will described how these cleaners 7 are fitted to the cabinet 1. As shown in FIG. 6A, engaging portions 715 for fixing the cleaners 7 to the cabinet 1 are provided on the flanks of the bottom cover 71 of the cleaners 7.

Each of the engaging portions 715 consists of a U-shaped elastic deformable piece provided on part of the bottom cover 71, and on part of the engaging portion 715 is provided an engaging pawl 716 to be engaged with an engaging concave 135 provided on a flank of the front panel 13.

Figure 6B:
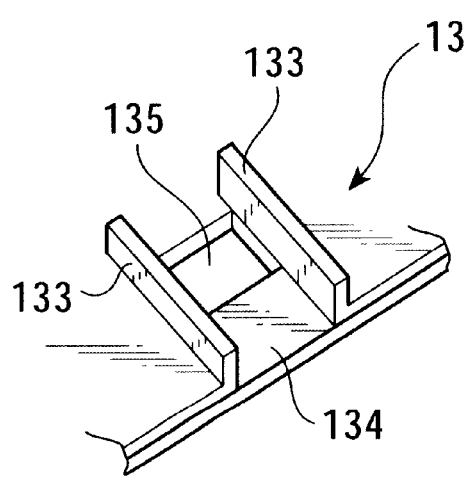
FIG. 6B is a drawing for describing fitting means provided on the inner side (air conditioner side) of the front panel.

On the other hand, as shown in FIG. 6B, two guide ribs 133 and 133 are arranged protrusively along the inserting direction of the cleaners 7 on the two flanks of the front panel 13, and guides 134 into which the engaging portions 715 are to be inserted are formed between the guide ribs 133 and 133. In each of these guides 134 is formed at a step lower level the engaging concave 135 with which the engaging pawl 716 is to engaged.

This arrangement enables the cleaners 7 to be securely fixed to the front panel 13 as the cleaners 7 are progressively inserted into the guides 134 eventually to cause the engaging pawls 716 to be snapped into the engaging concaves 135.

Although the guides 134 are provided on the two flanks of the front panel 13 in this embodiment, the positions of installing the guides 134 can be selected elsewhere as appropriate. Other appropriate means for fixing the cleaners 7 can also be selected.

Next will be described an example of procedure of cleaning the filters 5 of this air conditioner 1. First, when the user presses a filter cleaning button on the remote control device or the like, a control unit (not shown) gives an instruction to the motor 6 to cause the motor 6 to revolve in the direction of discharging the filters 5.

The turning force of the motor 6 is transmitted from the output gear 61 to a rotary gear 77, and its transmission to the rack 53 engaged with the rotary gear 75 causes the filters 5 to slide in the discharging direction (toward the bottom left in FIG. 1).

When the filters 5 begin sliding in the discharging direction, the rails 54 arranged on side edges of the filters 5 shift the scrapers 82a and 82b in the opening direction. As the scrapers 82a and 82b turn in mutually reverse directions and shift in the same way, the action of only one of them will be described below by way of example.

Figure 9A:
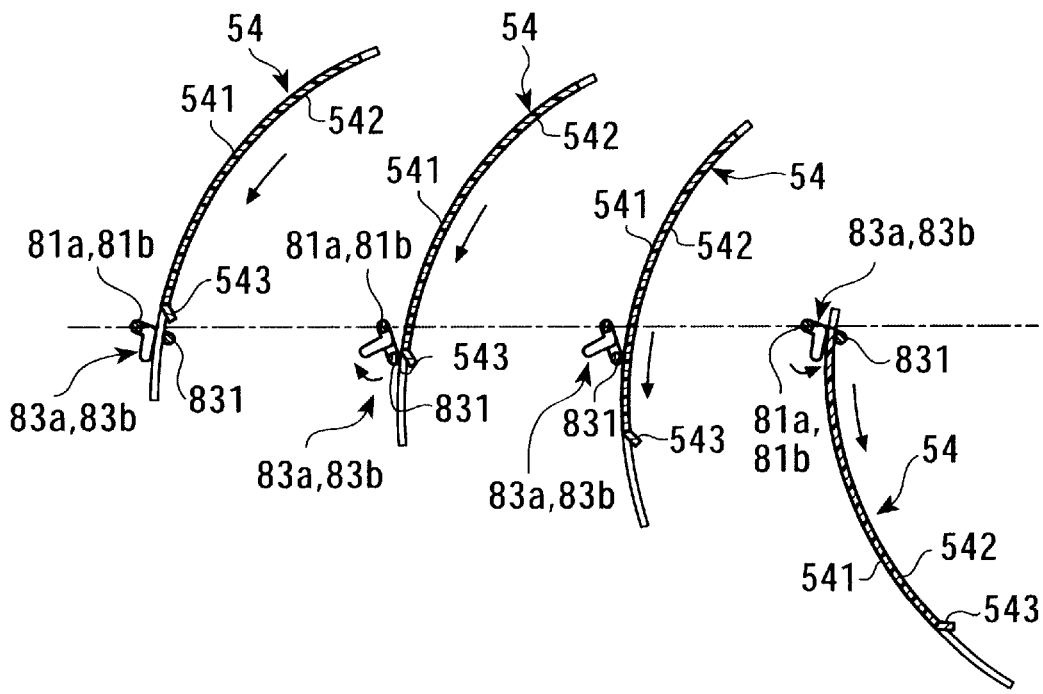
FIG. 9A is a drawing for describing the operation of the scraper in the opening direction.

As shown in FIG. 9A, when the filters 5 begin shifting, they are guided to opening rails 541, with the lever arms 831 of the opening/closing levers 83a and 83b riding on the guiders 543 provided at the ends of the rails 54.

Then, as the lever arms 831 rotate round the shafts 81a and 81b while riding on the opening rails 541, the scrapers 82a and 82b are forcibly shifted in the opening direction.

Dust stuck to the filters 5 is scraped off as the scrapers 82a and 82b, remaining in the open state, are guided into the cleaners 7 and shift between the bushes 73 and 74 provided within the cleaners 7.

Figure 10:
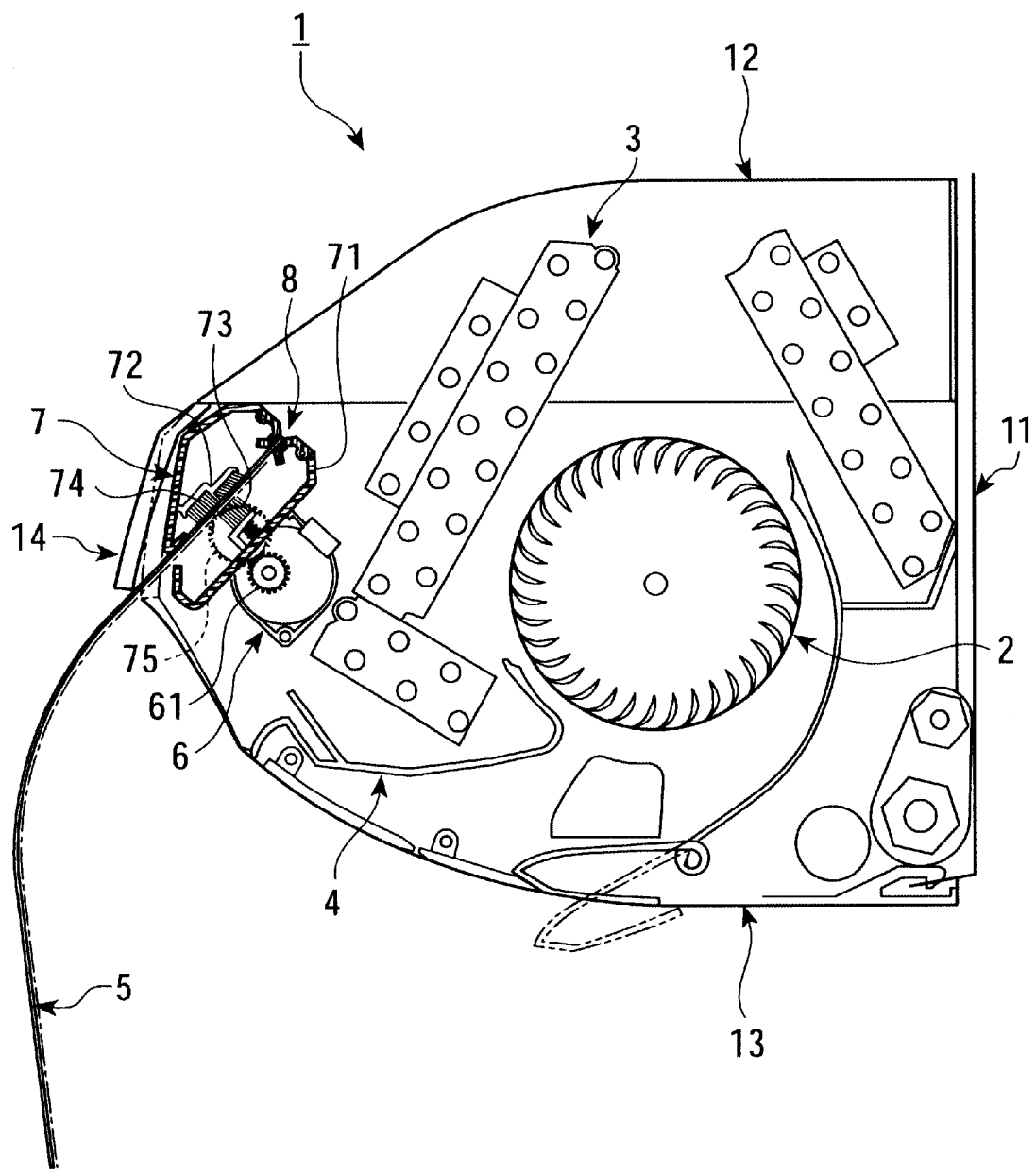
FIG. 10 shows a section of essential parts in a state in which a filter is drawn out of the cabinet.
Figure 11:
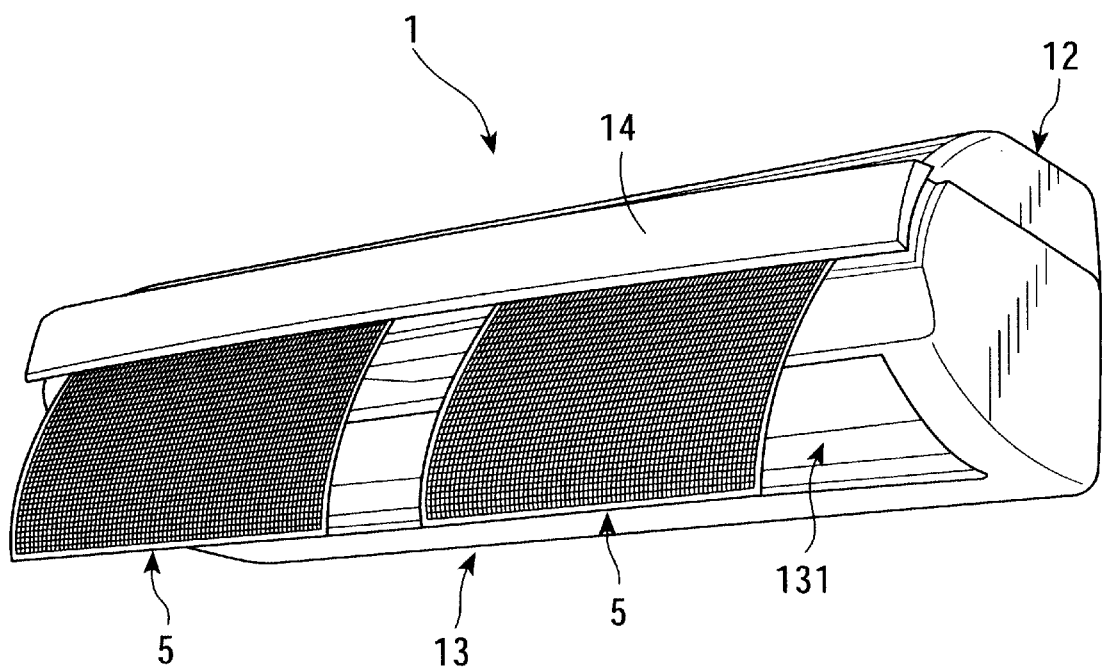
FIG. 11 shows a perspective view of a state in which filters are drawn out of the cabinet.

Then, as shown in FIG. 10 and FIG. 11, the tips of the filters 5 come into contact with the underside of the hinged panel 14 of the front panel 13 and, while forcing the hinged panel 14 upward, are drawn out of the interior unit. Although the hinged panel 14 is forced upward by the filters 5 in this embodiment, it is also conceivable to provide dedicated opening/closing means to open and close the panel without entailing a load on the filters 5.

When the filters 5 have shifted by a prescribed quantity, a control unit (not shown) causes the filters 5 to slide in the stowing direction (toward top right in FIG. 1) by sending an instruction for reverse revolution to the motor 6. So that the dust accommodated dated in the cleaners 7 may not stick to the filters 5 and be carried out of the cleaners then, the scrapers 82a and 82b are pressed in the closing direction.

Figure 9B:
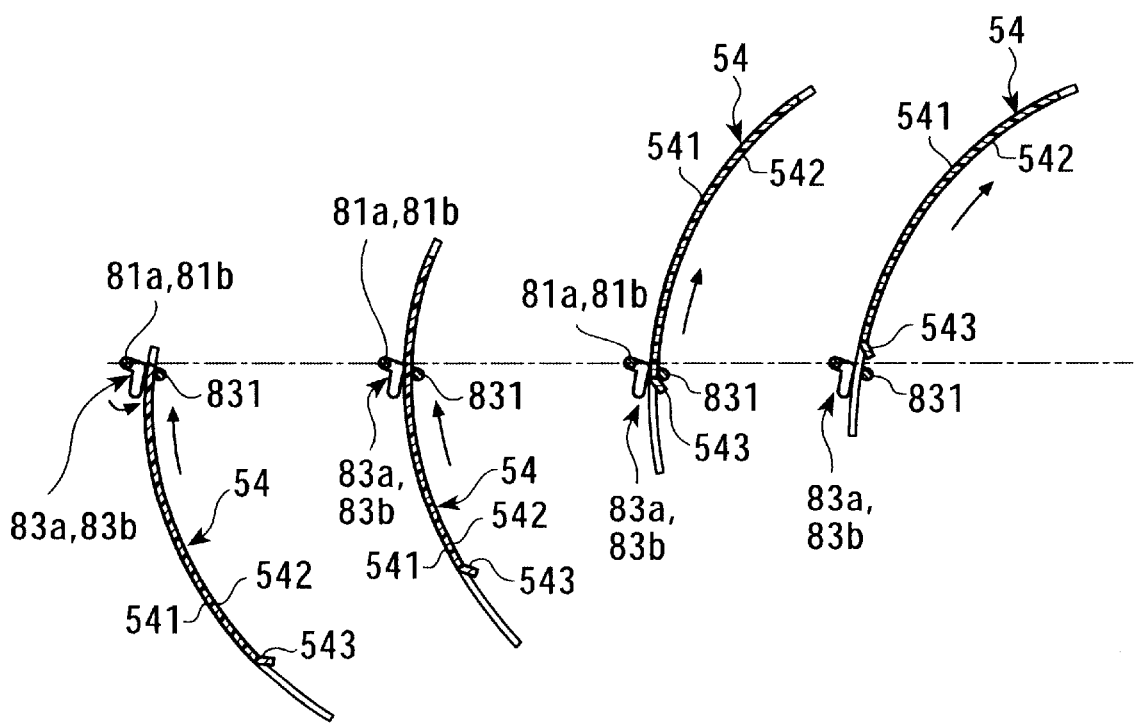
FIG. 9B is a drawing for describing the operation of the scraper in the closing direction.

Thus, as shown in FIG. 9B, the lever arms 831 having shifted along the opening rails 541 are forcibly returned to the closed state by the pressure of springs when they arrive at the ends of the rails 54, causing the scrapers 82a and 82b to come into contact with each other.

Now, when the filters 5 start shifting in the stowing direction, the lever arms 831 are guided as they are to the closing rails 542, and the scrapers 82a and 82b are kept in the closed state. Then the filters 5, with their faces wiped by the contact faces 821 of the scrapers 82a and 82b, are brought into the interior unit while being kept in a clean state.

When the cleaners 7 become filled with dust after the cleaning procedure described has been repeated a number of times, the dust having accumulated inside can be removed by opening the front panel 13, undoing the engaged state and taking out the cleaners 7.

While one cleaner 7 is provided per filter 5 in this embodiment, if for instance the filters 5 are installed in two positions in a single cabinet 1, the cleaners 7 and the motors 6 to drive them will also be provided in two positions each.

Although the cabinet 1 in the embodiment described above is supposed to be one for an air conditioner having a ceiling-wall type interior unit, a cleaning unit according to the invention can as well be applied to a usual wall-fitted type air conditioner, and the configuration of the cabinet can be appropriately selected according to the specification.

Further, although the filters 5 according to the invention are supposed to be discharged outward from the hinged panel 14 of the cabinet 1 after passing the cleaners 7 in the embodiment described above, the filters 5 may as well be arranged to be able to reciprocate within the cabinet 1. This mode of implementation is also included in the scope of the present invention.

While the invention has been described in more detail with reference to a specific embodiment thereof, the scope of the invention as stated in the claims should include such modifications, alterations and equivalent techniques which persons skilled in the art having understood the contents of this specification can readily work out.

What is claimed is:

1. An air conditioner whose cabinet having an air intake port and an air outlet port accommodates a heat exchanger and an air blower and in which a dust filter or filters are arranged in at least one position between said air intake port and said heat exchanger, wherein:

sliding means for reciprocating said filters and cleaners, arranged to come in contact with said filters along the shifting paths of said filters are provided within said cabinet.

2. The air conditioner according to claim 1 wherein said filter sliding means reciprocate said filters into and out of said cabinet.

3. The air conditioner according to claim 1 wherein said cleaners are detachably provided on said cabinet.

4. The air conditioner according to claim 1 wherein said cleaners have a bottom cover having a first brush or brushes for cleaning one side each of said filters and a top cover openably fitted to said bottom cover and having a second brush or brushes for cleaning the other side each of said filters, and are arranged in at least one position in said cabinet.

5. The air conditioner according to claim 4 wherein at least one of said brushes has an upright brush, which comes into contact with the filters subsequentially at a right angle, and an inclined brush, which comes into contact with the filters obliquely at a prescribed angle.

6. The air conditioner according to claim 4 wherein inlet slits are provided to let said filters into said cleaners between the two ends each of said bottom cover and said top cover, and said inlet slits have openings on the shifting paths of said filters.

7. The air conditioner according to claim 6 wherein at least one of said inlet slits has a shutter to open said inlet slits when said filters are shifting in the forward direction, press said inlet slits in the closing direction when said filters are shifting in the backward direction, and thereby to prevent the dust having accumulated in said cleaners from being discharged out of said cleaners.

8. The air conditioner according to claim 7 wherein said shutter has a pair of shafts arranged in parallel to each other, a pair of scrapers opening and closing round said shafts in directions moving away and towards each other, and opening/closing levers fitted to said shafts to open or close said scrapers via prescribed scraper opening/closing means.

9. The air conditioner according to claim 8 wherein each opposing face of said scrapers has a wiper which, when the scrapers are closed, come into contact with said filters to wipe off the dust stuck to said filters.

10. The air conditioner according to claim 8 wherein rails along which said opening/closing levers shift and guiders, formed at both ends of the rails, for guiding said opening/closing levers towards either opening rails or closing rails of said rails are provided at parallel edges of said filters along the sliding direction.

11. The air conditioner according to claim 1 wherein each of said filters has a mesh section in a grid form and a frame surrounding the mesh, both being molded integrally, and the height of meshes parallel to the sliding direction (warps) is set to be higher than the height of meshes orthogonally crossing the sliding direction (wefts).

* * * * *